TEXTILES, FLUID
TREATING APPARATUS.
J. Truman,
1,792 X. Washing Machine,
Patented Aug. 21, 1812.
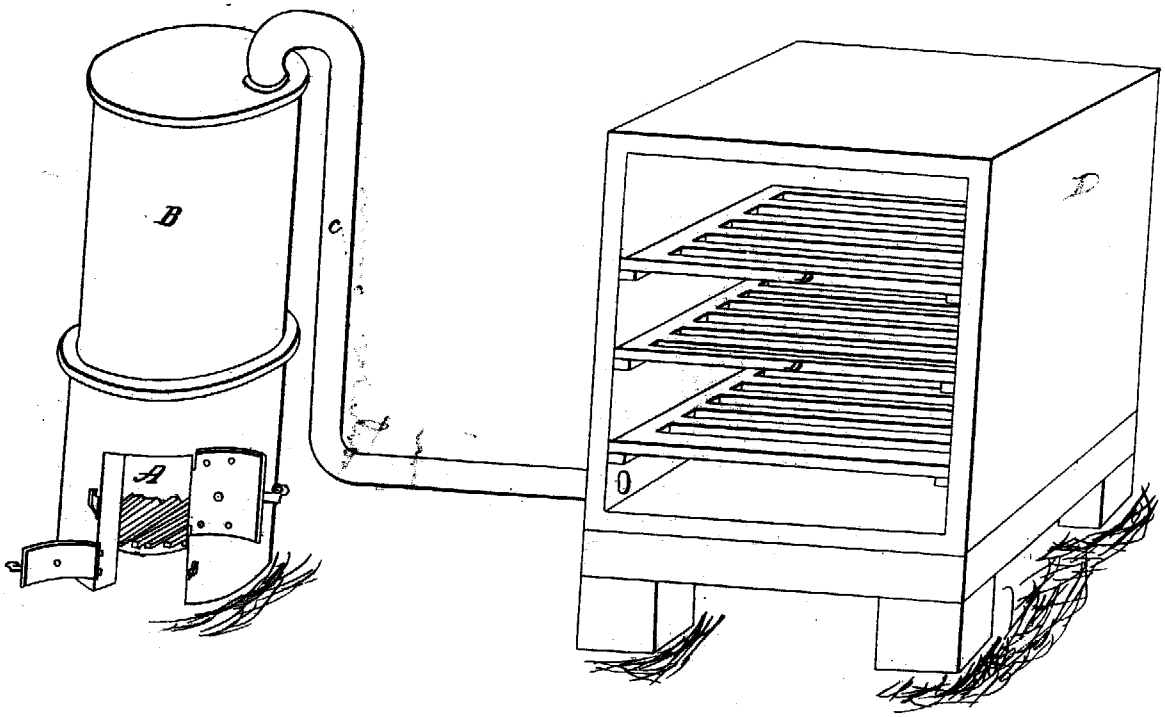

1192X

James Foreman

Letters Patent

The schedule referred to in these Letters Patent and making part of the same containing a description in the words of the said James Foreman himself of his Steam Washer, This invention consists in the application of steam for the purpose of washing and cleaning clothes in the manner hereinafter mentioned.

The furnace is a cylinder of cast or sheet iron other metal of any required diameter with a grate at or near the bottom a boiler of any metal of any diameter to correspond with the cylinder and of sufficient capacity to contain the required quantity of water. The boiler has a cover steam tight, communicating with the top or breast of the boiler is a pipe to convey the steam to the box or vessel hereinafter described, —— A Box or vessel of wood of suitable size to contain the quantity of clothes required to be washed with a tight cover. In the box or vessel or moveable racks at equal distances from each other, the lowest to be one third nearer the bottom than the racks to slide down from the top on rests to keep them apart. The linnen or cotton clothes to be saturated in an alkaline solution made of equal quantities of pearl ash and hard soap dissolved in water, the clothes thus saturated to be squeezed or wrung gently out and laid on the racks, beginning at the bottom until the box or vessel is full, the steam pipe attached to the boiler to be inserted in the side or end of the box or vessel near the bottom so as to communicate the steam. at the bottom of the box or vessel is an aperture for the discharge of the dirty suds.
The steam generated in the boiler is communicated through the pipe to the bottom of the box or vessel and mounting through the clothes aided by the alkaline solution disengages the dirt from the clothes a part of which runs off in the suds and the rest may be rinsed off altho I have described the steam washer as above, yet the boiler which generates the steam, the pipe which conveys the steam from the boiler to the box or vessel and the box tub or other vessel which

[illegible]

[illegible]

[illegible]

[illegible]

Yours [illegible]

Sir,

Adelphi Chambers

John Street

W.C.